United States Patent [19]

Ludolf et al.

[11] Patent Number: 4,771,219

[45] Date of Patent: Sep. 13, 1988

[54] LIGHT EMITTING DIODE CONTROL CIRCUIT

[75] Inventors: Wilhelm Ludolf, Ostfildern; Rolf-Dieter Sommer, Stuttgart; Hermann Bachmann, Esslingen, all of Fed. Rep. of Germany

[73] Assignee: Richard Hirschmann Radiotechnisches Werk, Fed. Rep. of Germany

[21] Appl. No.: 869,709

[22] Filed: Jun. 2, 1986

[30] Foreign Application Priority Data

Jun. 1, 1985 [DE] Fed. Rep. of Germany ....... 3519711

[51] Int. Cl.[4] .............................................. B05C 11/02
[52] U.S. Cl. .................................... 315/118; 315/112; 307/311
[58] Field of Search ................ 307/310; 315/112, 117, 315/118, 307, 309, 169.3; 313/499

[56] References Cited

U.S. PATENT DOCUMENTS 3,705,316 12/1972 Burrous et al. ...................... 307/310
4,149,071 4/1979 Nagai et al. ......................... 250/199
4,160,934 7/1979 Kirsch ................................. 315/307
4,182,977 1/1980 Stricklin ............................. 315/307
4,238,707 12/1980 Malissin et al. ..................... 315/309
4,443,890 4/1984 Eumurian ........................... 455/613

FOREIGN PATENT DOCUMENTS 2723419 1/1977 Fed. Rep. of Germany .

OTHER PUBLICATIONS

Werner Wiesner, "Ansteuerung von LED's in Optischen Sendern" Electronic, 26/28, Dec. 1984.

Primary Examiner—David K. Moore
Attorney, Agent, or Firm—Robert J. Koch

[57] ABSTRACT

When a light-emitting diode is controlled for transmitting high-frequency signals, such as video signals, or quick-changing analog signals, the electro-optical signal conversion is subjected to distortions due to temperature variations in the barrier layer of the diode which arise due to rapidly varying power losses. The circuit presented herein includes a compensating stage operatively connected to the diode, for alleviating such signal distortions. The system is capable of differentiating between the respective conditions of rising and falling edges of the control in the representative signal of signals to be transmitted.

19 Claims, 3 Drawing Sheets

LIGHT EMITTING DIODE CONTROL CIRCUIT

BACKGROUND OF THE INVENTION

1. Field of the Invention

The invention relates to a control circuit for a light-emitting diode and, more particularly, an arrangement which includes a switching or actuation stage or phase compensating for the impact of thermal conditions which affect the radiation effort or light output of a light-emitting diode.

2. Description of the Related Art

It is known that the emission or output $\phi_o$ of a light-emitting diode, hereinafter referred to as LED, at a given forward current or forward bias, $I_F$, is a function of the temperature. NTC resistors or base-emitter portions of transistors have been employed to compensate for fluctuations of the output $\phi_o$ of LEDs caused by changes in temperature described, for example, in the technical journal "Elektronik", No. 26, 1984, page 90. Such circuits only compensate for relatively slow or "static" temperature fluctuations, and cannot compensate for momentary "dynamic" temperature fluctuations which are experienced during operation and which arise with temperature changes of the barrier layer of the diode due to the attendant power loss variations arising in the barrier layer.

A relatively linear relationship between the forward current $I_F$ and the output $\phi_o$ within the usual operating ranges of an LED is normally assumed in analog data transmissions in opto-electronic systems. Thus, changes of the radiation or output due to the fluctuation of the temperature of the barrier layer are normally not considered. In some applications such as high capacity analog opto-electronic data transmission systems, in which a direct intensity modulation or pulsed operation of the LED is effected, the non-linear behavior of LEDs cannot be disregarded as in digital opto-electronic data transmission systems.

SUMMARY OF THE INVENTION

It is an object of the invention to provide a circuit with control of an LED which allows effective compensation for momentary so-called "dynamic" temperature fluctuations, and the associated fluctuations in the output efficiency due to (a) a dynamic change of the internal power loss of the LED, or (b) a change of the barrier layer temperature, or (c) a change of the opto-electronic efficiency of the LED per se.

It is a further object of the invention to allow high level or high capacity dynamic operation with respective control of the LED, for example by means of video signals, such that a transmission not hampered by thermally induced distortions is achieved.

Temperature impacts or temperature variations which arise due to electrical power loss in the LED, are compensated for by a non-linear compensating stage provided in front of this LED in accordance with the objects of the invention. This is of particular significance for transmission of impulse signals and pictures or images in the context of video signals using LEDs. The LED circuits, according to the invention, can be implemented as inexpensive building elements enabling transmission substantially without distortions or similar disruptions.

In use, the circuit arrangement according to the invention reduced a video transmission distortion of white impulses in test lines from 5% to below 1%.

In digital signal transmissions substantially fewer distortions arise with the use of the circuit according to the invention. The transmission distances of light-wave conductors using LED senders can thereby be increased considerably.

In accordance with a further embodiment of the invention a circuit assembly including two non-linear compensating stages is provided with a control stage adapted to distinguish between rising and falling flanks of an LED control signal ($U_E$) to actuate one or the other of the two compensating stages in conformity therewith.

Based on investigations carried out for the invention, it was found that the temperature variations of the LED barrier layer and, consequently, the changes of the output or intensity of the LED, differ between the occurrence of rising and falling flanks of the control signal for the LED. This fact will be explained further below. Independent non-linear compensating stages which selectively function in accordance with the occurrence of rising or falling flanks to compensate for the differing, repective, thermal characteristics are contemplated. The control stage may be adapted to distinguish between the rising and the falling flanks by a differentiator-circuit which controls the selection of the respective compensating stage. This feature is important to provide an enhanced and distortion-free transmission.

In accordance with a further embodiment of the invention a second non-linear compensating stage is provided connected in series with the first non-linear compensating stage. Temperature compensation, and ultimately radiation or output compensation, is substantially fully carried out for both rising and falling edges in a first stage which is preferably designed to optimally compensate for either rising or falling edges. Residual distortion or impacts still result in the oppositely extending edge. The second compensating stage is only activated upon occurrence of an opposite extending edge to compensate for such residual distortion. A differentiator may be provided to control a selector switch which either connects or bypasses the second compensator depending on the slope of the signal.

As will be explained in greater detail further below, the LED exhibits different temperature characteristics upon occurrence of a rising flank or edge and a falling flank or edge.

In another alternative embodiment, the time constant of the non-linear compensation stage can be switched or selected between two time-constant values. The selective switching between two time constants is accomplished by a control stage which distinguishes between the rising and falling flanks or edges of the control signal for the LED. A more economic structure is thus provided as only one compensating stage is required, but which nevertheless will carry out the compensation of the temperature disturbances or the emission intensity of the LED presented by both rising and falling slopes of LED input or control signals.

It is further preferred that the non-linear compensating stage or the non-linear compensating stages include R-C links.

In particular situations the control circuit assembly may exhibit non-linear compensating stages having R-L links.

BRIEF DESCRIPTION OF THE DRAWINGS

The foregoing and other objects, features and advantages will become apparent from the following description, reference being made to the accompanying drawings.

DETAILED DESCRIPTION OF THE PREFERRED EMBODIMENT

The radiation efficiency of an LED is not only a function of the forward current $I_F$, but also a function of the barrier layer temperature $T_s$. This can generally be expressed as follows:

$$\phi_o = f_1(I_F, T_s) \quad (1)$$

The barrier layer temperature, or boundary layer temperature, in turn, is a function of the power loss $P_{tot}$. This, in turn, is the product of the forward voltage $U_F$ of the LED and of the forward current $I_F$. Thus:

$$P_{tot} = U_F \times I_F. \quad (2)$$

While the output efficiency increases as the forward current increases, the power loss in the barrier layer and the barrier layer temperature $T_s$ also increases at the same time. Of course, as the barrier layer temperature rises, the output efficiency decreases.

The efficiency ($\eta$) of an LED is the ratio of the output efficiency and the electrical output $P_{tot}$.

$$\eta = \frac{O_o}{P_{tot}}. \quad (3)$$

Thus, the efficiency $\eta$ is a function of the temperature.

In the temperature range of $$-60° C. < T_s < +100° C.$$

the following expression applies for the temperature coefficient $T_K$ $$T_K \approx -0.6\%/°C.,$$

with reference to the maximum radiation output at the maximum electrical values for $P_{tot}$.

The emitted light is generally a linear function of the forward current, or exhibits only small deviations from linear behavior which may be neglected when using direct current control, or control signals with a slower signal response, or low frequencies, such as generally analog data transmission. Sufficient time is available to adjust to the changes in power loss or the boundary layer temperature, for balancing the heat between the boundary layer and the semiconductor plate or wafer, and the housing of the LED, respectively, when the forward current gradually changes.

The assumption that linear behavior of the LED will be maintained on conversion of the forward current into the output radiation or respective display is invalid when transmitting high frequency signals such as video signals, or digital data, such as square-wave impulse signals. This will be explained in the following.

Figure 1:
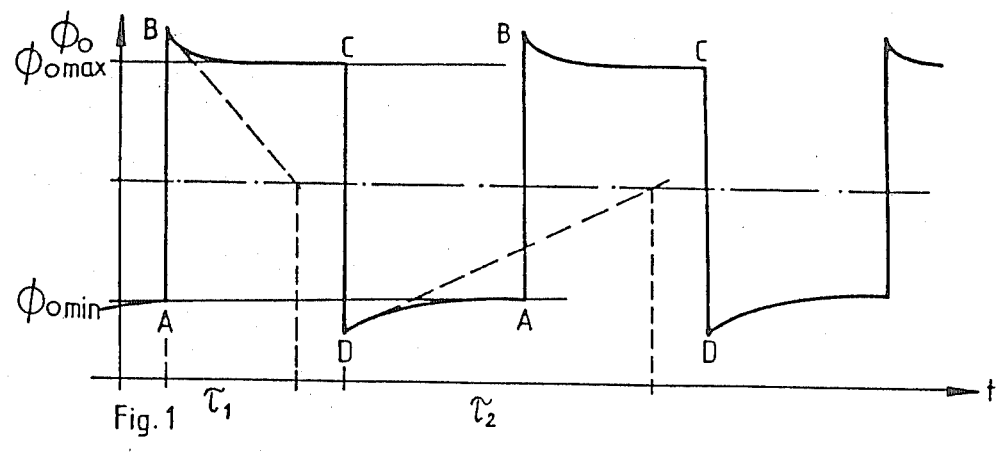
FIG. 1 is a diagram indicating the output signal of an LED which is controlled with a square-wave impulse signal without use of the inventive control and adjustments.

FIG. 1 shows the path of the output radiation $\phi_o$ when applying a square-wave impulse having a frequency of 1 kHz. The LED shown is an 1A148 (ASEA HAF0) type LED. The value of the forward current $I_{max}$ is 100 MA and the value of the forward current $I_{min}$ is 10 mA, with the $\Delta I$ in this example amounting to 90 mA.

As is shown in FIG. 1 the optical output signal of the diode exhibits overshoots, also referred to as deviations or excessive peaks hereinbelow, at the various flanks or edges. As is further shown, these peaks at the rising edges (AB) are of a duration indicated by time constant $\tau_1$, whereas the respective overshoots at the downwardly directed or falling flank or edge (CD) are indicated by the larger time constant $\tau_2$.

When a rising edge AB (compare FIG. 1) occurs, the switch S of the shown current is in the indicated position. The R-C link is made up of a capacitor or condenser $C_1$ and a resistor $R_1$, having a time constant $\tau_1 \approx C_1 R_1$. The switch S is in the position indicated by dashes during the downwardly directed flank or falling edge CD (compare FIG. 1). The R-C link $C_2 R_2$ is then operative, and has a time constant of $\tau_2 \approx C_2 R_2$. As mentioned, $\tau_1$ is smaller than $\tau_2$. In the diagram it is indicated that the input voltage $U_e$ for the LED arises at that junction of resistor $R_o$ facing away from the current or voltage source, whereas the output voltage corresponding to the output $\phi_o$ of the LED is read across resistor $R_2$.

When using forward current for the LED of $I_{max}$ of 100 mA, in this example, the time constant $\tau_1$ is 30 μs, and for $I_{min}$ the time constant $\tau_2$ is approximately 45 μs.

The described thermal behavior or response of LEDs, or the phenomenon of the excess peaks when using an LED for high frequency or impulse signals with fast amplitudinal changes, is further illustrated with reference to FIG. 3 and with respect of the physical events.

As was mentioned, the barrier temperature $T_s$ and consequently the radiation output $\phi_o$ are a function of the electrical power loss experienced in the LED, with the power loss being dissipated primarily as heat in the barrier layer. For the example of an infrared LED of the type 1A148, the forward voltage $U_F$ is 1.3 volt when $I_{min}$ is 10 mA, and it is 1.8 V when $I_{max}$ is 100 mA. The resultant power losses are $P_{tot}(I_{min}) = 13$ mW and
$P_{tot}(I_{max}) = 180$ mW Thus, the difference or rise of the power loss $P_{tot}$ is 167 mW.

Figure 3:
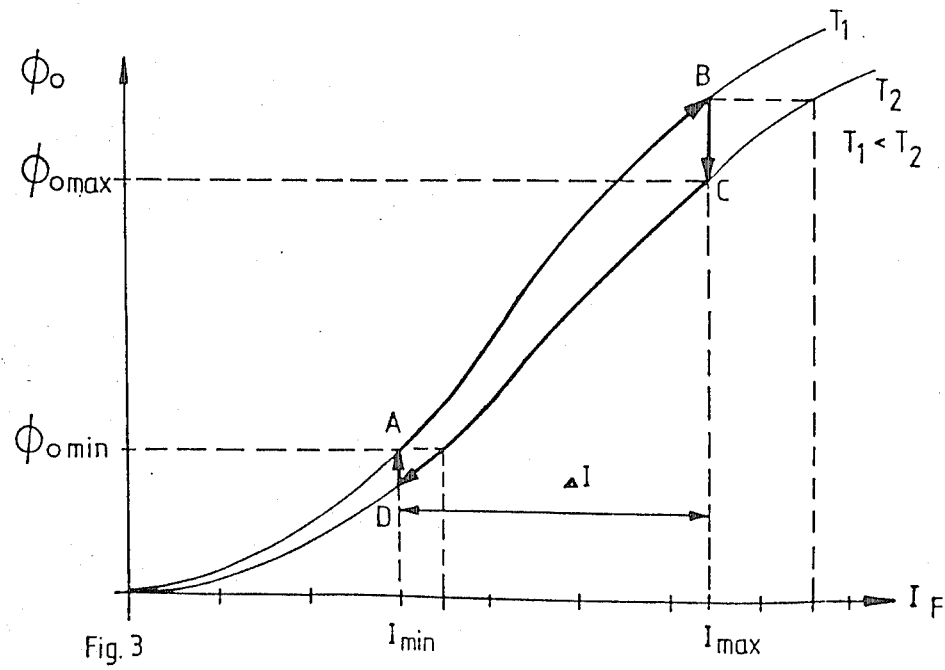
FIG. 3 is a diagram depicting the behavior of the radiation efficiency of an LED as a function of the forward current.

In FIG. 3 the radiation output $\phi_o$ is plotted as a function of the applied forward current $I_F$. The letters A and B, and C and D correspond to the signal points A, B, and C, D in FIG. 1. In the subsequent discussion, accordingly, reference will be made to FIG. 1 and to FIG. 3.

At the point A, i.e., when the forward current $I_F$ hs its lowest value of $I_{min}$, the barrier layer is relatively cold. As mentioned, the output, or the relative efficiency, of the LED is greater when the barrier layer is coolest. At point A the output $\phi_o$ min corresponds to $I_{min}$, see FIG. 3. When the forward current, or the forward voltage, respectively, rises from $I_{min}$ to $I_{max}$, i.e., from point A to point B, the associated rising electrical power loss does not immediately, or only after a delay, impact on the heating of the barrier layer. Thus, the efficiency of the LED with reference to the temperature behavior remains initially constant, and at point B the LED output is greater than the respective output $\phi_{omax}$. A temperature rise occurs subsequently and the output efficiency drops from the peak B in FIG. 1, and the radiation output drops to $\phi_{omax}$ as shown in FIG. 3. Thus, the point C in FIG. 3 is reached.

The upper curve, in the course of which are included the points A and B in FIG. 3, is the result of a substantially constant temperature $T_1$. The temperature $T_1$ is less than the substantially constant temperature $T_2$. the lower curve reflects the result at this lower temperature $T_2$. Points C and D are included in the lower curve. In other words, the upper curve, with points A and B, is the result of a cooler barrier layer, whereas the lower curve, with points C and D, is the result of a warmer barrier layer of the LED.

At point C, due to a time lapse, the barrier layer has reached a stationary condition where the barrier layer is in thermal equilibrium with the respective housing.

At point C the forward current is then lowered from $I_{max}$ to $I_{min}$, see FIG. 3, and the output $\phi_o$ drops correspondingly, see FIG. 1. However, the barrier layer retains some heat for a period of time therefore the radiation output drops below $\phi_{omin}$ due to the thermal behavior of the LED. Thus, it will overshoot or peak somewhat beyond the radiation efficiency line, see D in FIG. 1. Due to little or no electrical power loss at point D no additional internal heat is supplied at the barrier layer. Further cooling and heat dissipation results through the associated housing. The radiation output $\phi_{omin}$ increases gradually as indicated in the interval from A to D in FIG. 1, and the respective increase in FIG. 3, with the radiation output reaching the value of $\phi_{omin}$. The cycle is then repeated.

The foregoing findings were established on the basis of investigations and experiments which were carried out in connection with the instant invention. In order to substantially preclude thermally induced signal distortions, or to compensate for such phenomena in an LED, as described above, the arrangements described in the following are proposed as embodiments of the invention.

Figure 4:
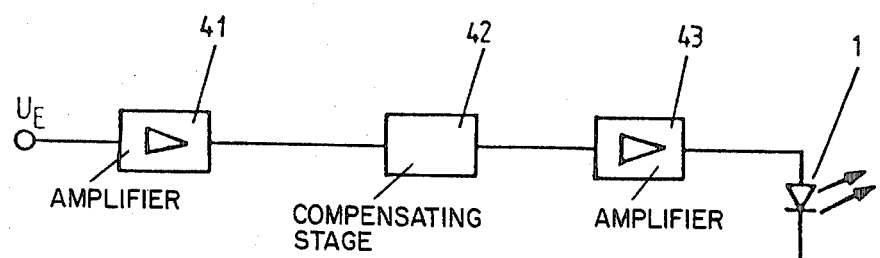
FIG. 4 is one embodiment of a circuit according to the invention.

FIG. 4 shows a circuit diagram in which the input voltage $U_E$ is amplified in the first amplifier 41. The respective output is passed to a compensation module or stage 42 which transforms the current, or voltage, respectively, required for control of the LED, so that the distortions arising due to the thermal behavior or characteristics of the LED such as overshooting, or peaks and similar distortions, are substantially compensated for or adequately alleviated. The output signal emanating from the compensating stage 42 can be amplified again by a second amplifier 43.

Figure 5:
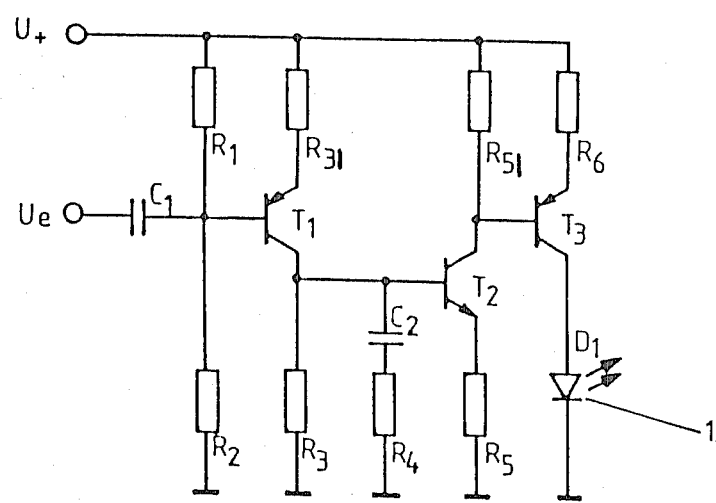
FIG. 5 is an embodiment of a compensating stage which can be used in the present invention.

FIG. 5 shows an exemplary embodiment of a compensating stage or module. The input voltage $U_e$ is passed via a separating capacitor or condenser $C_1$ to the junction point of the resistors $R_1$ and $R_2$ which are positioned between the source of the operating voltage $U_+$ and ground and which function as voltage dividers. The junction point of the resistors $R_1$ and $R_2$ is connected to the base of a pnp transistor $T_1$, and the emitter portion of this transistor $T_1$ is connected, with interposition of an emitter resistor $R_{31}$ at the source of operating voltage $U_+$. The respective collector of the transistor $T_1$, is connected to ground with interpositioning of a resistor $R_3$. In parallel with respect to the resistor $R_3$ there is provided a series arrangement including a capacitor or condenser $C_2$ and a resistor $R_4$. The base of a second transistor $T_2$ is connected at the junction point between the resistor $R_3$ and the collector of the first transistor $T_1$. This second transistor $T_2$ is a pnp type; its collector is connected to the source of operating voltage $U_+$, with interpositioning of a resistor $R_{51}$, whereas the emitter of the second transistor $T_2$ is grounded, with interpositioning of the emitter resistor $R_5$. The collector of the second transistor $T_2$ is connected to the base of a third pnp-type transistor $T_3$, the emitter of which is connected, via its emitter resistor $R_6$, to the source of operating voltage $U_+$. The collector of the third transistor $T_3$ is connected to the LED which is generally identified by reference numeral 1, the cathode portion of which is grounded.

The compensating stage transforms the control signal $U_e$ so as to avoid distortions of the LED output signal due to thermal behavior or conditions by the R-C link $C_2R_3$. In other words, the signal for control of the LED is sufficiently transformed or modified so that a substantially proportional reversal of the signal course is provided to alleviate or preclude the overshooting path or extent of the output signal of the LED 1.

Other options are available and can be selected by persons with skill in the art; and the compensating stage or link can be configured to provide for an optimum of compensation of the thermally induced distortions which can arise when operating an LED in pulsed operation, or during the transmission of video signals. An R-L link may be used in place of an R-C link.

Figure 2:
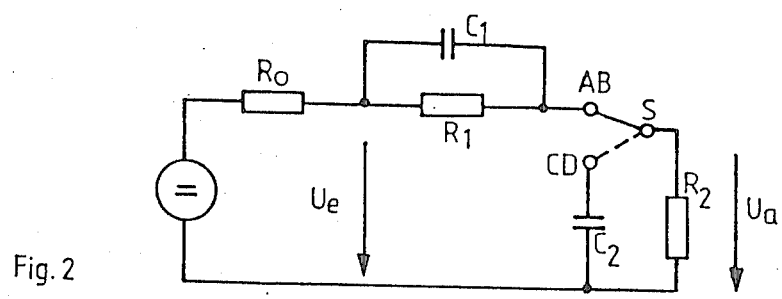
FIG. 2 is an equivalent-circuit diagram indicative of the thermal behavior of an LED.

As mentioned above, in the course of investigations pertaining to this invention, it was determined that the respective peak or temporary deviation for a rising edge signal has a different swing-related time constant, i.e., a smaller time constant $\tau_1$, than the temporary deviation or peak of the dropping or falling edge, which has the time constant $\tau_2$, see FIG. 1 and the equivalent-circuit diagram of FIG. 2. This phenomenon of the different time constants for the peaking behavior in the case of a rising flank and a falling flank, can be explained using physical principles, as follows.

When the forward current $I_f$ rises from $I_{min}$ to $I_{max}$, see FIG. 1, i.e., from point A to point B, which is a positive rise, due to the electrical power loss the barrier layer is relatively rapidly heated. The semiconductor plate or wafer and the housing of the LED are in heat exchanging contact or relation. Accordingly, the heat from the plate is continuously transferred or dissipated to the housing. heat is further introduced to the barrier layer, or the semiconductor chip, respectively, due to the inner electrical power loss, over the width of the impulse due to the maximal forward current $I_{max}$, and the barrier layer temperature is always higher than that of the respective housing.

A stationary or constant condition is attained when the thermal equilibrium has been reached between the semiconductor plate and the housing of the LED.

The respective sudden drop of the forward current from $I_{max}$ to $I_{min}$, i.e., from point C to point D in FIG. 1, is accompanied by a sudden reduction of the power loss in the barrier layer. However, the semiconductor plate can only relatively slowly transfer its heat to the LED housing. This means that the barrier layer temperature is lowered only gradually and the radiation output of the diode incrases correspondingly, i.e., also relativelyslowly, when compared to the decrease which arises during the increase of the forward current from $I_{min}$ to $I_{max}$, i.e., from the point A to point B in FIG. 1, to the stationary condition. In other words, for the rising flank and the downwardly directed flank different time constants arise, wherein $\tau_1$ is smaller than $\tau_2$.

This further phenomenon, which was established during the course of investigations carried out in the context of the invention, allows an enhanced compensation or adjustment to the dynamic distortions in LEDs caused by the respective thermal conditions. A further embodiment is presented in this context in the following and with reference to FIG. 6 of the drawings.

The control voltage $U_E$ for the LED is passed, as required via a first amplifier 61, to a selector switch stage 62 and to a control stage 63, i.e., a differentiator 63, the latter having the capability to distinguish the rising and falling edges of the control signal for the LED. The output signal from the differentiator 63 actuates the selector switch stage 62 in accordance with the occurrence of a rising or a falling edge into an upper and lower switch position. The control signal $U_E$ is then passed either through an upper compensating stage 64 or a lower compensating stage 65, as well as through a second amplifier 66, as required, and then to the LED 1.

As has been mentioned previously, in the event of a rising flank or leading edge, a distinctly different peak, overshooting or overswing behavior, is observed than in the event of a falling flank or trailing edge, i.e., the time constants $\tau_1$ and $\tau_2$ are distinct from one another. In order to compensate for both situations in an optimal manner, separate and distinct compensating stages 64 and 65 are employed matched to the distinct distortions. These are respectively selected by the interaction of the differentiator 63 and the selector switch stage 62, as a function of the occurrence of a rising or falling flank. Thus, an optimal compensation of the thermally induced distortions in high grade or high capacity LED transmission systems is attained.

In accordance with a further embodiment of the invention the differentiator 63 is configured in such a way that it will generate its output signal for switching of the selector switch stage 62 only for the case of flanks with a predetermined inclination or slope. Thus, when the inclination or slope of the flank is less than that of the predetermined minimum slope, no selective switching occurs between the compensating stages 64 and 65.

As has been explained in detail in the foregoing, the compensation is primarily required when the control signals are rather rapidly varied, i.e., amplitude jumps are present with short rise or transition time periods. These conditions are experienced in the case of video signals, with $tr \approx 200$ μs.

When the signal variation is rather slow, there will usually be sufficient time to attain a temperature equilibrium or adjustment with respect to the barrier layer and the LED housing, or the ambient, respectively, and overshooting conditions or distortions, respectively, due to short-lived or transient changes of the barrier layer temperature do not, or only negligibly, distort the output signal of the LED.

Figure 6:
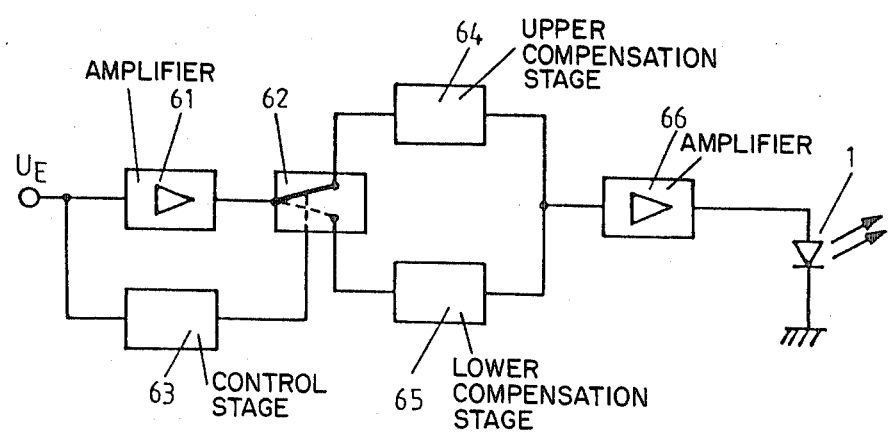
FIG. 6 is a further embodiment of a circut according to the invention.

Two separate compensating stages 64 and 65 are described in the embodiment shown in FIG. 6. In accordance with the scope of the invention, embodiments with a single compensation stage can also be used, i.e., a combination of the compensating stages 64 and 65. R-C links and/or R-L links can be utilized for shaping the control signal. A single compensating stage can include circuitry for switching between the respective values of time constants $\tau_1$ and $\tau_2$. This can be done in such a way that respective values or signals of the capacitor or condenser, resistor and/or inductor are varied in response to the occurrence of a rising or falling edge of the LED control signal. Thus, the arrangement or circuit in accordance with the invention can be considerably simplified and economics improved accordingly.

Figure 7:
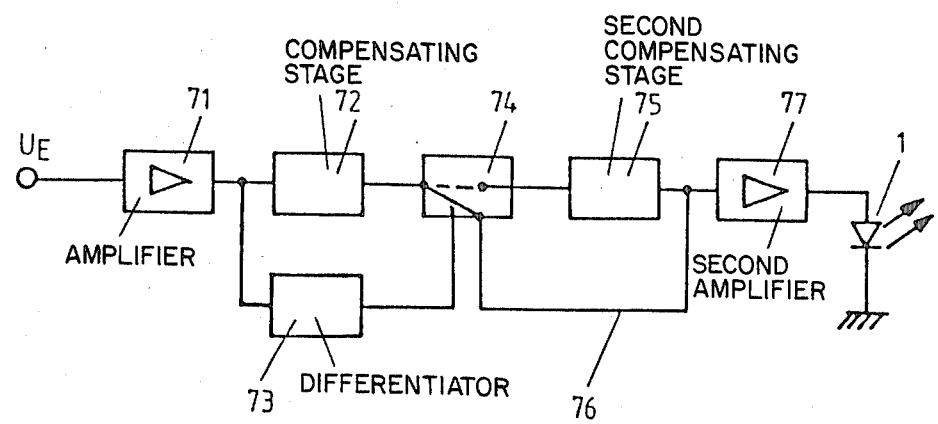
FIG. 7 shows a third embodiment of a circuit according to the invention.

A further embodiment of the invention is illustrated in FIG. 7. The control signal $U_E$ is passed, as required, through a first amplifier 71, to a first compensating stage 72 and simultaneously to a differentiator 73. The differentiator 73 controls a selector-switch stage 74, connected to the compensating stage 74, in accordance with the detection of rising or falling edges respectively. One output line from the selector-switch stage 74 extends to a second compensating stage 75. A second output line is configured as by-pass line 76 for by-passing the second compensating stage 75. The output signal of the second compensating stage 75, or the first compensating stage 72 when by-pass line 76 is activated may be passed, as required, through a second amplifier 77—to the LED 1.

As mentioned, there occur two distinct and separate time constants for the distortions as respectively represented by the rising and falling flanks of the control signal. When using one compensating stage one can fully compensate either the distortion represented by the rising flank, or the distortion as represented by the falling flank, and there is merely remaining a residual distortion of the respective other of the pair. As required, the residual distortion can be compensated in additional compensating stage which is activated for that flank with the associated residual distortion. With reference to FIG. 7, this additional compensating stage is represented by the second compensating stage 75. Accordingly, the second compensating stage 75 is operational by way of the differentiator 73 and the selector switch stage 74, in order to insure full compensation of such residual distortion.

Reference in this disclosure to specific embodiments is not intended to restrict the scope of the invention.

I claim:

1. An LED circuit comprising:
    means for generating a compensated control signal from an input signal $U_E$, wherein said means for generating distinguishes between a rising slope input signal and a falling slope input signal and modifies said input signal so as to compensate for electrical power loss in an LED due to dynamic temperature variations which give rise to distortion of said input signal based on slope of said input signal and wherein said compensation is non-linear;
    means for emitting light responsive to said compensated control signal wherein said means for emitting is an LED wherein said means for generating includes, means for distinguishing between a rising slope input signal and a falling slope signal, connected to said input signal $U_E$;

means connected to said input signal $U_E$ and responsive to said means for distinguishing, for switching said input signal $U_E$ to a first output upon detection of a rising slope and a second output upon detection of a falling slope;

a first non-linear compensating stage tuned to LED temperature characteristics of a rising slope signal, connected to said first output;

a second non-linear compensating stage tuned to LED temperature characteristics of a falling slope signal connected to said second output; and wherein said means for emitting is connected to said first and second compensating stages.

2. An LED circuit comprising:

means for generating a compensated control signal from a high capacity or video type input signal $U_E$, wherein said means for generating modifies said input signal so as to compensate for electrical power loss in an LED due to dynamic temperature variations which give rise to distortion of said input signal and wherein said compensation is non-linear;

means for emitting light responsive to said compensated control signal wherein said means for emitting is an LED;

wherein said means for generating includes, means for distinguishing between a rising slope input signal and a falling slope input signal, connected to said input signal $U_E$;

means connected to said input signal $U_E$ and responsive to said means for distinguishing, for switching said input signal $U_E$ to a first output upon detection of a rising slope and a second output upon detection of a falling slope;

a first non-linear compensating stage tuned to LED temperature characteristics of a rising slope signal, connected to said first output;

a second non-linear compensating stage tuned to LED temperature characteristics of a falling slope signal connected to said second output; and wherein said means for emitting is connected to said first and second compensating stages.

3. An LED circuit comprising:

means for generting a compensated control signal from an input signal $U_E$, wherein said means for generating distinguishes between a rising slope input signal and a falling slope input signal and modifies said input signal so as to compensate for electrical power loss in an LED due to dynamic temperature variations which give rise to distortion of said input signal based on slope of said input signal and wherein said compensation is non-linear;

means for emitting light responsive to said compensated control signal wherein said means for emitting is an LED, wherein said means for generating includes a first non-linear compensating stage connected to said input signal $U_E$ for generating a first compensated signal;

means for distinguishing between a rising slope input signal and a falling slope input signal, connected to said input signal $U_E$;

means connected to an output of said first non-linear compensating stage and responsive to said means for distinguishing, for switching said first compensated signal between a first output and a second output;

a second non-linear compensating stage connected to said first output; and wherein said means for emitting is connected to an output of said second non-linear compensating phase and said second output.

4. An LED circuit as in claim 3, wherein said first non-linear compensating stage is tuned to LED temperature characteristics of a predetermined slope direction;

said means for switching connects the first output when said input signal exhibits a slope direction other than said predetermined slope direction; and said second non-linear compensating stage is tuned to LED temperature characteristics to compensate for residual distortion in said first compensated signal when said input signal $U_E$ exhibits a slope direction other than said predetermined slope direction.

5. An LED circuit as in claim 1, wherein said first and second non-linear compensating stages include at least one time link each which set a first and a second characteristic time constant wherein said means for switching respectively actuates said time links.

6. An LED control circuit as in claim 5, wherein said time links which set said first and second characteristic time constants are R-C links.

7. An LED control circuit as in claim 5, wherein said time links which set said first and second characteristic time constants are R-L links.

8. An LED circuit as in claim 5, wherein said means for distinguishing detects signal slopes having an absolute value of a predetermined positive value greater than that of a signal having a minimum non-zero slope.

9. An LED control circuit as in claim 4, wherein said non-linear compensating stages include R-C links.

10. An LED control circuit as in claim 4, wherein said non-linear compensating stages include R-L links.

11. An LED circuit as in claim 4, wherein said means for distinguishing detects signal slopes having an absolute value of a predetermined positive value greater than that of a signal having a minimum non-zero slope.

12. An LED circuit as in claim 3, wherein said means for distinguishing detects signal slopes having an absolute value of a predetermined positive value greater than that of a signal having a minimum non-zero slope.

13. An LED control circuit as in claim 3, wherein said non-linear compensating stages include R-C links.

14. An LED control circuit as in claim 3, wherein said non-linear compensating stages include R-L links.

15. An ED circuit as inclaim 1, wherein said means for distinguishing, detects signal slopes having an absolute value of a predetermined positive value greater than that of a signal having a minimum non-zero slope.

16. An LED control circuit as in claim 1, wherein said means for generating includes an R-C link.

17. An LED control circuit as in claim 1, wherein said means for generating includes an R-L link.

18. An LED circuit comprising:

means for generating a compensated control signal from a high capacity or video type input signal $U_E$, wherein said means for generating modifies said input signal so as to compensate for electrical power loss in an LED due to dynamic temperature variations which give rise to distortion of said input signal and wherein said compensation is non-linear;

means for emitting light responsive to said compensated control signal wherein said means for emitting is an LED;
wherein said means for generating includes,
a first non-linear compensating stage connected to said input signal $U_E$ for generating a first compensated signal;
means for distinguishing between a rising slope input signal and a falling slope input signal, connected to said input signal $U_E$;
means connected to an output of said first non-linear compensating stage and responsive to said means for distinguishing, for switching said first compensated signal between a first output and an second output;
a second non-linear compensating stage connected to said first output; and
wherien said means for emitting is connected to an output of said second non-linear compensating stage and said second output.

19. An LED circuit as in claim 18, wherein said first non-linear compensating stage is tuned to LED temperature characteristics of a predetermined slope direction;
said means for switching connects the first output when said input signal exhibits a slope direction other than said predetermined slope direction; and
said second non-linear compensating stage is tuned to LED temperature characteristics to compensate for residual distortion in said first compensated signal when said input signal $U_E$ exhibits a slope direction other than said predetermined slope direction.

* * * * *